(12) United States Patent
Parkes

(10) Patent No.: US 10,663,717 B2
(45) Date of Patent: May 26, 2020

(54) SYSTEMS AND METHODS FOR BEAM DIRECTION THROUGH A WINDOW

(71) Applicant: THE BOEING COMPANY, Chicago, IL (US)

(72) Inventor: Dale Alan Parkes, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 337 days.

(21) Appl. No.: 15/692,427

(22) Filed: Aug. 31, 2017

(65) Prior Publication Data

US 2019/0064506 A1    Feb. 28, 2019

(51) Int. Cl.
*G02B 26/08* (2006.01)
*F41H 13/00* (2006.01)
*H01S 3/00* (2006.01)

(52) U.S. Cl.
CPC ....... *G02B 26/0816* (2013.01); *F41H 13/005* (2013.01); *H01S 3/0071* (2013.01)

(58) Field of Classification Search
CPC .. G02B 5/32; G02B 2027/0116; G02B 17/08; G02B 17/0816; G02B 17/0832; G02B 17/086; G02B 2027/011; G02B 2027/0174; G02B 2027/0178; G02B 26/06; G02B 27/0025; G02B 27/0037; G02B 27/0068; G02B 27/0081; G02B 27/0172; G02B 27/02; G02B 27/4211; G02B 27/4216; G02B 27/4255; G02B 27/4261; G02B 27/4272; G02B 27/4277; G02B 27/58; G02B 5/203; G02B 6/0001; F41H 13/005; H01S 3/0071
USPC ........................................................ 359/16
See application file for complete search history.

(56) References Cited

U.S. PATENT DOCUMENTS

| | | | |
|---|---|---|---|
| 7,626,152 B2 | 12/2009 | King et al. | |
| 8,654,314 B2 | 2/2014 | King et al. | |
| 2008/0042042 A1 | 2/2008 | King et al. | |
| 2013/0077161 A1* | 3/2013 | Blackburn | G02B 23/02 359/429 |
| 2016/0320630 A1 | 11/2016 | Donaldson et al. | |

* cited by examiner

*Primary Examiner* — Collin X Beatty
*Assistant Examiner* — Grant A Gagnon
(74) *Attorney, Agent, or Firm* — Joseph F. Harding; The Small Patent Law Group LLC

(57) ABSTRACT

A system is provided that includes a light source, a first mirror, a second mirror, and a support structure. The light source provides light energy along an optical path extending along an optical axis. The first mirror receives and re-directs the light energy from the light source, and pivots about an azimuth axis. The second mirror receives the re-directed light energy from the first mirror and to re-direct the light energy toward a target through a window. The support structure has a first end and a second end. The first end is mounted at a support rotation point, with the support structure rotating about the support rotation point as the first mirror pivots about the azimuth axis. The second mirror is mounted to the second end of the support structure.

20 Claims, 8 Drawing Sheets

SYSTEMS AND METHODS FOR BEAM DIRECTION THROUGH A WINDOW

FIELD OF EMBODIMENTS OF THE DISCLOSURE

Embodiments of the present disclosure generally relate to systems and methods for directing a light beam, for example directing a light beam through an exit window of an aircraft.

BACKGROUND OF THE DISCLOSURE

Optical beam directors may be used to provide relatively wide angle steering of optical beams, such as high and low power lasers, and/or optical sensors. Conventionally, installation of such systems on an air vehicle may involve a relatively large turret exterior to the outer mold line (OML) of the aircraft that increases drag and/or induces effects on the optical system such as jitter and wavefront error.

SUMMARY OF THE DISCLOSURE

Accordingly, improved beam direction, for example, without requiring the use of turrets, is provided in various embodiments disclosed herein.

Certain embodiments of the present disclosure provide a system that includes a light source, a first mirror, a second mirror, and a support structure. The light source provides light energy along an optical path extending along an optical axis. The first mirror is disposed along the optical path, and receives and re-directs the light energy from the light source. The first mirror to pivot about an azimuth axis. The second mirror receives the re-directed light energy from the first mirror and to re-direct the light energy toward a target through a window. The support structure has a first end and a second end. The first end is mounted at a support rotation point, and the support structure rotates about the support rotation point as the first mirror pivots about the azimuth axis. The support structure rotates about the azimuth axis or an axis parallel to the azimuth axis. The second mirror is mounted to the second end of the support structure.

Certain embodiments of the present disclosure provide a system. The system includes an enclosure, a light source, a first mirror, a second mirror, and a support structure. The enclosure has a boundary defining an interior and an exterior, and includes an exit window disposed along the boundary. The light source is disposed within the interior of the enclosure, and provides light energy along an optical path extending along an optical axis. The first mirror is disposed within the interior of the enclosure along the optical path, and receives and re-directs the light energy from the light source. The first mirror pivots about an azimuth axis. The second mirror is disposed within the interior of the enclosure, and receives the re-directed light energy from the first mirror and to re-direct the light energy toward a target through the exit window. The support structure is disposed within the interior of the enclosure. The support structure has a first end and a second end. The first end is mounted at a support rotation point. The support structure rotates about the support rotation point as the first mirror pivots about the azimuth axis. The support structure rotates about the azimuth axis or an axis parallel to the azimuth axis. The second mirror is mounted to the second end of the support structure.

Certain embodiments of the present disclosure provide a method. The method includes providing light energy from a light source along an optical path extending along an optical axis. The method also includes receiving the light energy with a first mirror disposed along the optical path, the first mirror pivots about an azimuth axis. Further, the method includes directing the light energy with the first mirror toward a second mirror. Also, the method includes receiving the redirected light energy from the first mirror with a second mirror. The method also includes directing the light energy with the second mirror toward a target through a window. The support structure has a first end and a second end, with the first end mounted at a support rotation point. The support structure rotates about the support rotation point as the first mirror pivots about the azimuth axis, with the support structure rotating about the azimuth axis or an axis parallel to the azimuth axis. The second mirror is mounted to the second end of the support structure.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods for directing a light beam out of a window toward a target. Various embodiments provide a heliostat beam director (that pivots along two axes, e.g., a roll and elevation) with an added mirror to direct the output beam from a first mirror toward an exit window via the added mirror. For example, in some embodiments, the added mirror is disposed along a roll axis rotation stage, travels at a predetermined ratio relative to a first mirror tip stage to compensate for beam walk, and also rotates about its own axis to keep the beam lined up with an exit aperture (e.g., exit window). Such an arrangement may have an annular field of regard (FOR) with a minimum tilt defined by a laser beam size and distance from the exit aperture, and a maximum tilt limited by the size of the exit aperture due to lengthening of an off-axis beam.

Various embodiments provide a beam that is steered toward the center of an exit window, reducing the required window size relative to conventional steering flat beam directors. In various embodiments, a telescope (if utilized) may be disposed off-gimbal, reducing the complexity of the on-gimbal system and requiring only a fixed-telescope arrangement. In various embodiments, the entire optical system (including light source, mirrors, and support structure) is disposed within a desired envelope (e.g., within the OML of an aircraft, and/or within a predefined enclosure volume). Various embodiments provide a high energy laser beam director, a directed countermeasure beam director, a scanning optical sensor, and/or a beam director for an optical communications system.

Figure 1:
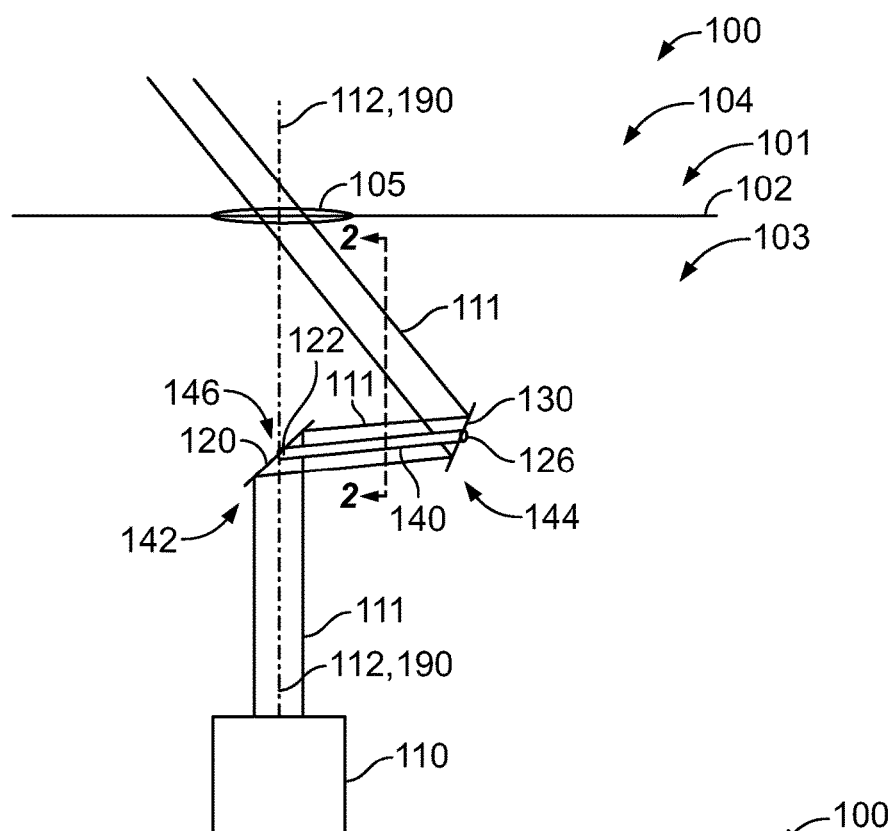
FIG. 1 provides a schematic block diagram of an optical system, according to an embodiment of the present disclosure.

FIG. 1 provides a schematic top view of a system 100. Generally speaking, the system 100 provides light energy to a target. For example, the system 100 may strike a target with a laser. As another example, the system 100 may use light directed toward a target for sensing purposes. As another example, the system 100 may direct a light beam for optical communications. As seen in FIG. 1, in the illustrated embodiment, the system 100 includes a light source 110, a first mirror 120, a second mirror 130, and a support structure 140, all of which are disposed within an enclosure 101.

The depicted enclosure 101 includes a boundary 102 that defines an interior 103 and an exterior 104. The boundary 102 is depicted schematically as a line, but in practice may define a 3-dimensional volume within the interior 103. The boundary 102 may define or conform to the OML of an aircraft. For example, the boundary 102 in various embodiments may be the fuselage or body of an aircraft, the interior 103 may be the interior volume of the aircraft, and the exterior 104 may be an external atmosphere. In the illustrated embodiment, the enclosure 101 includes an exit window 105 disposed along the boundary 102. The exit window 105 in various embodiments is a conformal window that generally adheres to or maintains the profile, shape, or envelope defined by the boundary 102 (e.g., to conform or fit within an OML of an aircraft). In contrast to the depicted exit window 105 or a conformal window, a turret extends beyond a profile, shape, or envelope of a structure associated with the turret, and disrupts the profile, shape, or envelope of such a structure. The exit window 105 in various embodiments provides a passageway for light energy (e.g., a laser) to pass from the interior 103 toward a target located in the exterior 104. In the illustrated embodiment, all of the components of the system 100, including the light source 110, first mirror 120, second mirror 130, and support structure 140 are disposed within the interior 103, removing the need for a turret and providing a smooth, generally continuous boundary surface, for example for improved aerodynamics.

The depicted light source 110 provides light energy along an optical path 111, with the initial path of the light energy out of the light source 110 defining an optical axis 112. In the illustrated embodiment, the optical axis passes through the exit window 105. The light source 110 in various embodiments includes a laser source, and provides a beam. In the illustrated embodiment, the light energy is a beam having a beam width 113.

As seen in FIG. 1, the first mirror 120 is disposed along the optical axis 112 and optical path 111. The first mirror 120 receives and re-directs the light energy from the light source 110. Light emitted from the light source 110 travels along the optical path 111 and along the optical axis 112 toward the first mirror 120. As seen in FIG. 1, the first mirror 120 is oriented at an oblique angle to the optical axis 112 (e.g., a reflective surface of the first mirror 120 is neither normal to nor parallel to the optical axis 112). Accordingly, the light energy is re-directed by the first mirror 120 so that the optical path 111 leaving the first mirror is no longer aligned with the optical axis 112. The first mirror 120 pivots about an azimuth axis 122. In FIG. 1, the azimuth axis 122 is perpendicular to the optical axis 112 and passes through the optical axis 112. For example, the first mirror 120 may be mounted to a shaft extending along the azimuth axis 122, with the shaft actuated by a motor or other device to pivot about the azimuth axis 122. By pivoting the first mirror 120 about the azimuth axis 122, the angle at which the optical path 111 and light energy are re-directed may be adjusted to aim the light energy.

As seen in FIG. 1, the depicted second mirror 130 is not disposed along the optical axis 112. The second mirror 130 of the illustrated embodiment receives the re-directed light energy from the first mirror 120, and to re-direct the light energy through a window (e.g., exit window 105) toward a target outside of the enclosure 101. Generally, the second mirror 130 has a reflective surface that receives the re-directly light energy from the first mirror 120, with the light reflected off of the reflective surface of the second mirror 130 redirected toward the exit window 105 and target. Accordingly, light may leave the light source 110 along the optical axis 112, reflect off the first mirror 120 toward the second mirror 130, and then reflect off the second mirror 130 toward the exit window 105 and/or a target outside of the enclosure 101. The optical path 111 thus aligns with or coincides with the optical axis 112 between the light source 110 and the first mirror 120, but does not align with or coincide with the optical axis 112 between the first mirror 120 and the second mirror 130 or between the second mirror 130 and the exit window 105.

Generally speaking, the depicted support structure 140 supports the second mirror 130 and to maintain the second mirror 130 in a position at which the second mirror 130 receives the re-directed light energy from the first mirror 120 to again re-direct the light energy (and optical path 111) toward the exit window 105 and target. As seen in FIG. 1, the support structure 140 of the illustrated embodiment has a first end 142 and a second end 144, with the support structure extending along a length with the second end 144 opposite the first end 142. It may be noted that the support structure 140 is depicted schematically as a single straight rod in FIG. 1, but may be shaped otherwise in various embodiments. For example, the support structure 140 may include a tube or other structure that surrounds a periphery or circumference of the first mirror 120 and/or second mirror 130. As another example, the support structure 140 may include a plurality of rods disposed about a profile defined by the first mirror 120 and/or the second mirror 130, and extending between the first mirror 120 and the second mirror 130.

The first end 142 of the support structure is mounted at a support rotation point 146, and rotates about the support rotation point 146 as the first mirror 120 pivots about the azimuth axis 122. The support structure 140 rotates about the azimuth axis 122 or an axis parallel to the azimuth axis 122. For example, in some embodiments, the support rotation point 146 is located along the azimuth axis 122 (e.g., the first end 142 of the support structure 140 is mounted to the first mirror 120 along the azimuth axis 122), while in other embodiments, the support rotation point 146 is offset from the azimuth axis (e.g., the first end 142 is mounted to a separate portion of the interior 103) with the support structure 140 rotating around an axis that is parallel to but offset from the azimuth axis 122. As the support structure 140 is mounted at the support rotation point 146 proximate the first end 142 of the support structure, a distance from the support rotation point 146 to the second end 144 defines a radius at which the second end 144 rotates or sweeps about the support rotation point 146.

Further, as seen in FIG. 1, the second mirror 130 is mounted to the second end 144 of the support structure 140. Accordingly, as the second end 144 of the support structure 140 rotates about the support rotation point 146 as the first mirror 120 pivots about the azimuth axis 122, the second mirror 130 (which is mounted to the second end 144) also rotates about the support rotation point 146 as the first mirror 120 pivots. In embodiments in which the support rotation point 146 and azimuth axis 122 are aligned, the second mirror 130 rotates about the azimuth axis 122 as the first mirror 120 pivots about the azimuth axis. In some embodiments, the second mirror 130 does not pivot or rotate with respect to the support structure 140, while in other embodiments the second mirror 130 does pivot or rotate with respect to the support structure 140 (e.g., the second mirror 130 pivots about an axis passing through the second end 144). By rotating the second end 144 and, accordingly, the second mirror 130, about the support rotation point 146, the second mirror 130 may be maintained along the optical path 111 as the optical path departs from the first mirror 120. It may further be noted that the system 100 (or aspects thereof) may also rotate about a roll axis 190 to provide for further flexibility in aiming the optical path 111 out of the exit window 105 toward a target.

Figure 11:
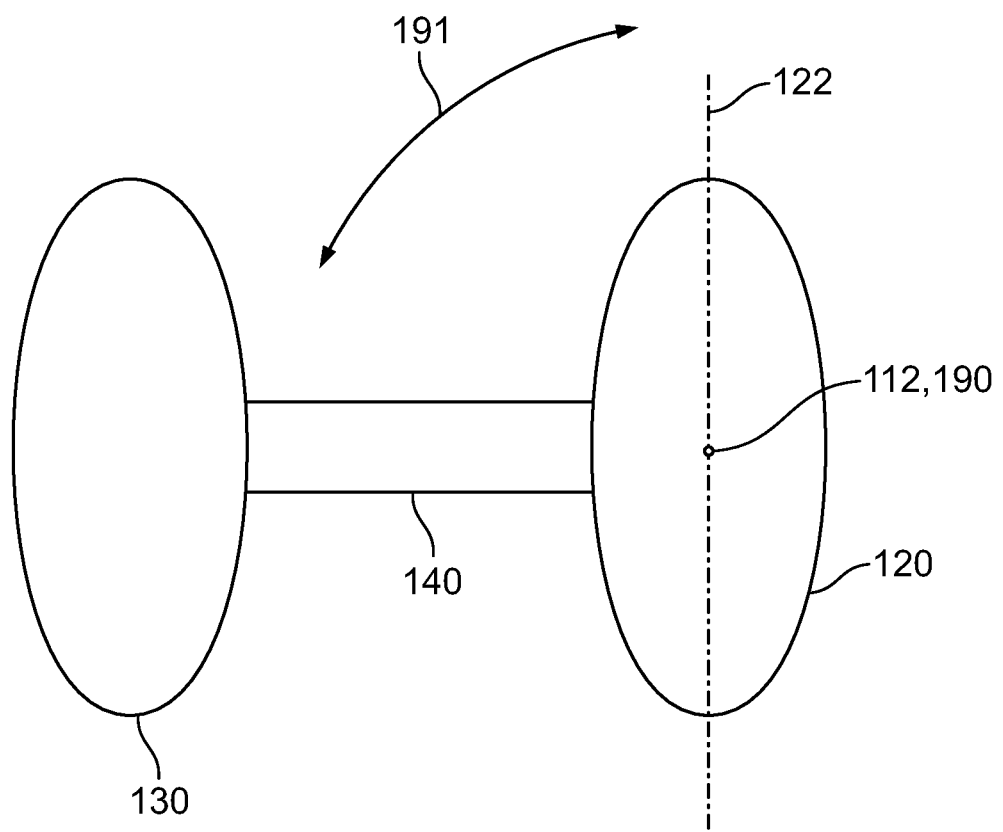
FIG. 11 is a schematic side view of the system as seen from the exterior 104 looking into and through the exit window.

In the illustrated embodiment, the roll axis 190 extends along the optical axis 112. Various aspects of the system 100 rotate as a unit about the roll axis 190, including the first mirror 120, the second mirror 130, and the support structure 140. For example, with reference to FIG. 1, the second mirror 130 may rotate about the roll axis 190 toward or away from a viewer out of the plane of the figure. FIG. 11 is a schematic side view of the system 100 as seen from the exterior 104 looking into and through the exit window 105. As seen in FIG. 11, the roll axis 190 (and optical axis 112) extend normal to the plane of the figure, pass through the center of the first mirror 120, and are perpendicular to the azimuth axis 122. In the illustrated embodiment, the first mirror 120, support structure 140, and second mirror 130 rotate as a unit about the roll axis 190 (e.g., clockwise or counter-clockwise along direction 191). As the second mirror 130 travels in an arc along direction 191 around the first mirror 120, an annular field of regard is defined by light reflecting off of the second mirror 130 and passing through the exit window 105.

Figure 2A:
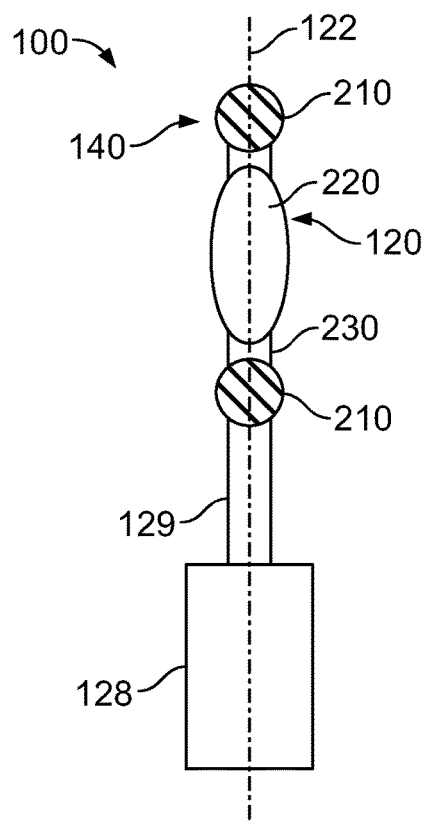
FIG. 2a illustrates an example embodiment of the system of FIG. 1 in which the support rotation point is disposed along the azimuth axis.

In some embodiments, the support structure 140 is mounted to the first mirror 120 or otherwise disposed along the azimuth axis 122. For example, FIG. 2a illustrates an example embodiment of the system 100 in which the support rotation point 146 is disposed along the azimuth axis 122. FIG. 2a is a sectional schematic view taken along lines 2-2 of FIG. 1. For the example depicted in FIG. 2a, the first end 142 is mounted to the first mirror 120 along the azimuth axis 122. In FIG. 2a, the support structure 140 includes a pair of rods 210 extending along a length of the support structure 140 (or from the first end 142 to the second end 144), with the rods 210 disposed along the periphery of a reflective surface 220 of the first mirror 120. The rods 210 are mounted to the first mirror 120 via shafts 230 that extend along the azimuth axis 122, with the shafts 230 fixed to the first mirror 120 (e.g., either directly or via a frame) such that the shafts 230 (and support structure 140) rotate with the first mirror 120 as the first mirror 120 pivots about the azimuth axis 122. For the embodiment depicted in FIG. 2a, a first motor 128 drives a shaft 129 to pivot the first mirror 120 (and support structure 140) about the azimuth axis 122. The shaft 129 is coupled to the support structure 140 and extends along the azimuth axis 122. It may be noted that the second mirror 130 may be mounted to the rods 210 (or other structure of the support structure 140) in some embodiments in a manner which allows pivoting of the second mirror 130 with respect to the support structure 140 (e.g., mounted to a shaft that is allowed to rotate in a bearing mounted to the support structure 140), and in other embodiments in a manner which does not allow pivoting of the second mirror 130 with respect to the support structure 140 (e.g., fixedly mounted to a shaft that is in turn fixedly mounted to the support structure 140). It may be noted that the first mirror 120 may be mounted directly or indirectly to a frame or structure within the interior 103 to maintain the first mirror 120 in position along the azimuth axis 122.

Figure 2B:
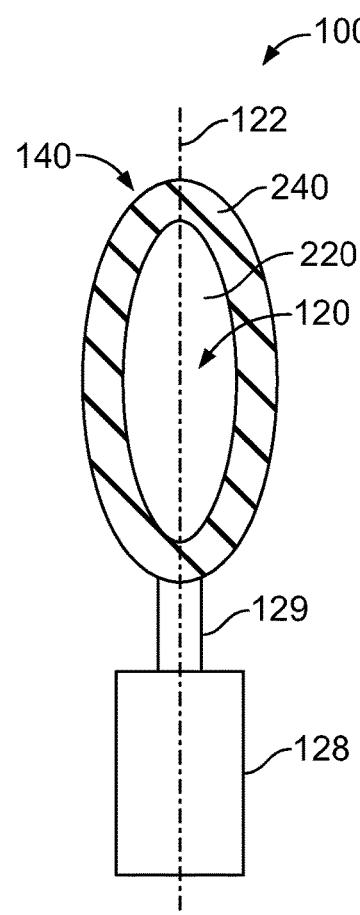
FIG. 2b illustrates another example embodiment of the system of FIG. 1 in which the support rotation point is disposed along the azimuth axis.

As another example of an embodiment in which the support structure 140 is mounted to the first mirror 120 or otherwise disposed along the azimuth axis 122, FIG. 2b illustrates another example embodiment of the system 100 in which the support rotation point 146 is disposed along the azimuth axis 122. FIG. 2b is a sectional schematic view taken along lines 2-2 of FIG. 1. For the example depicted in FIG. 2b (as well as for the example depicted in FIG. 2A), the first end 142 is mounted to the first mirror 120 along the azimuth axis 122. In FIG. 2b, the support structure 140 includes a tubular frame 240 extending along a length of the support structure 140 (or from the first end 142 to the second end 144), with the tubular frame disposed along the periphery of a reflective surface 220 of the first mirror 120 (such that light is directed from the first mirror 120 on the interior of the tubular frame 240 or through the opening of the tubular frame 240. The tubular frame 240 of the support structure 140 is fixed to the first mirror 120 such that the tubular frame 240 rotates with the first mirror 120 as the first mirror 120 pivots about the azimuth axis 122. For the embodiment depicted in FIG. 2b, a first motor 128 drives a shaft 129 to pivot the first mirror 120 (and support structure 140) about the azimuth axis 122. The shaft 129 is coupled to the support structure 140 and extends along the azimuth axis 122. It may be noted that the second mirror 130 may be mounted to the tubular frame 240 in some embodiments in a manner which allows pivoting of the second mirror 130 with respect to the tubular frame 240 (e.g., mounted to a shaft that is allowed to rotate in a bearing mounted to the tubular frame 240), and in other embodiments in a manner which does not allow pivoting of the second mirror 130 with respect to the tubular frame 240 (e.g., fixedly mounted to a shaft that is in turn fixedly mounted to the tubular frame 240).

Referring again to FIG. 1, as the support structure 140 of the illustrated embodiments rotates with the first mirror 120, the depicted support structure 140 may be understood as being rotationally constrained with the first mirror 120. In various embodiments, the support structure 140 may be rotationally constrained with the second mirror 130, or, in other embodiments, the support structure 140 may not be rotationally constrained with the second mirror 130. Put another way, in some embodiments, the second mirror 130 is free to rotate with respect to the support structure 140, while in other embodiments the second mirror 130 is not free to rotate with respect to the support structure. Rotation of the second mirror 130 in various embodiments allows the optical path 111 to remain fixed (or nearly fixed) at or near a center of the exit window 105, for example, as the first mirror 120 is pivoted and the support structure 140 and second mirror 130 rotate responsive to the pivoting of the first mirror 120. In other embodiments, the second mirror 130 may be prevented from pivoting with respect to the second end 144 of the support structure 140, thereby allowing some amount of "walk" of the optical path 111 with respect to the center of the exit window, but also allowing for reduced weight, expense, and/or size of the system 100.

Figure 3A:
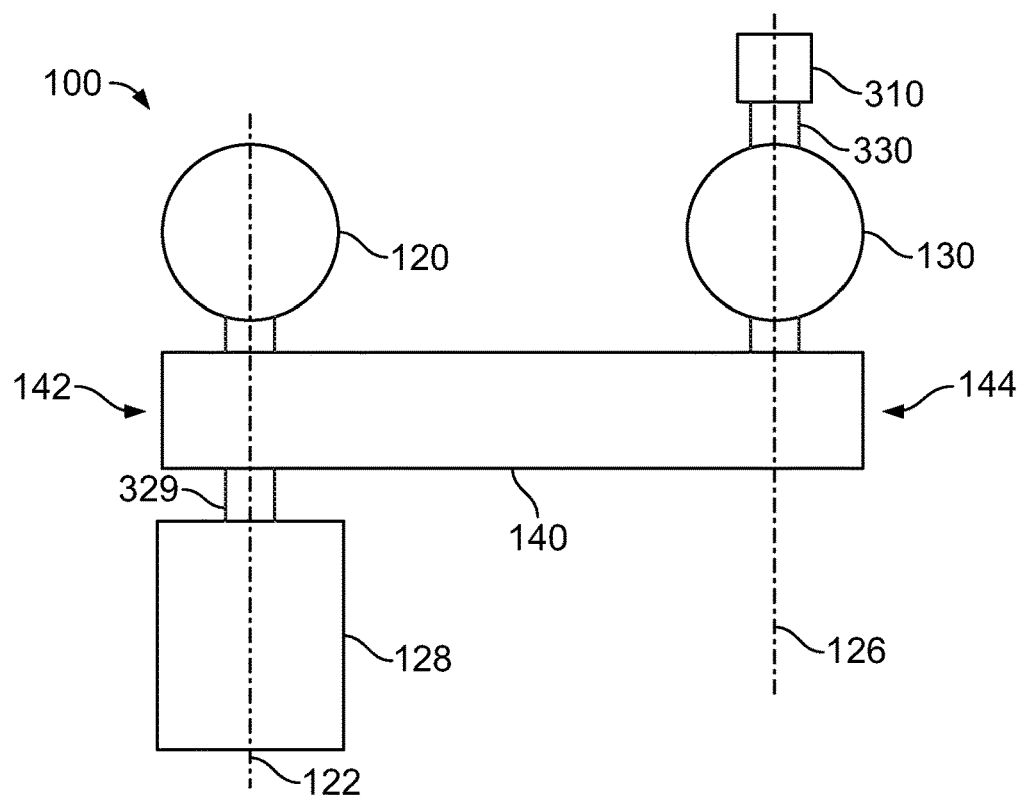
FIG. 3a illustrates a schematic view of an example embodiment of the system of FIG. 1 in which the second mirror pivots with respect to the second end of the support structure.

For example, FIG. 3a illustrates a schematic view of an embodiment of the system 100 in which the second mirror 130 pivots with respect to the second end 144 of the support structure 140. In the embodiment illustrated in FIG. 3a, the second mirror 130 is mounted to the second end 144 of the support structure 140 along a second mirror axis 126, and pivots about the second mirror axis 126 as the first mirror 120 pivots about the azimuth axis 122. In various embodiments, the pivoting of the second mirror 130 is controlled so that the second mirror 130 maintains direction of the light energy (along optical path 111) at a predetermined location (e.g., a portion of the exit window 105 such as the center of the exit window 105, and/or a predetermined target). In the embodiment depicted in FIG. 3a, the system 100 includes two motors—a first motor 128 (see also FIGS. 2a and 2b) and a second motor 310. The first motor 128 is coupled to the first mirror 120 and pivots the first mirror 120 (and the support structure 140) about the azimuth axis 122 (e.g., via shaft 329. The second motor 310 is coupled to the second mirror 130 and is pivots the second mirror 130 about the second mirror axis 126. For example, the second motor 310 may drive a second shaft 330 that extends along the second mirror axis 126. The amount of rotation that the second motor 310 actuates the second mirror 130 may be determined based on the amount of rotation of the first mirror 120 along with the geometrical relationships between the first mirror 120, second mirror 130, and desired orientation of optical path 111 (e.g., through the center of the exit window 105). Accordingly, the first motor 128 and second motor 310 may be controlled to rotate the first mirror 120 and the second mirror 130, respectively, a desired amount to direct the optical path 111 toward a target while maintaining the optical path 111 at an orientation to pass through the center of the exit window 105 (or at another desired orientation).

Figure 3B:
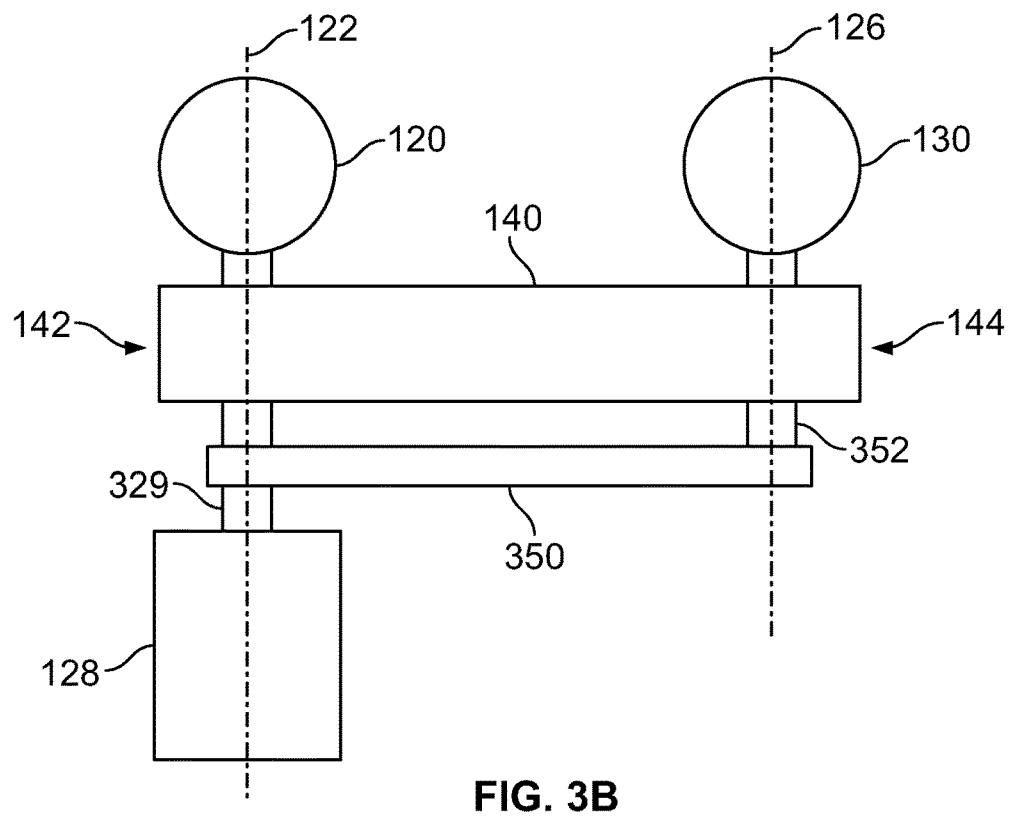
FIG. 3b illustrates a schematic view of another example embodiment of the system of FIG. 1 in which the second mirror pivots with respect to the second end of the support structure.

As another example, FIG. 3b illustrates a schematic view of another embodiment of the system 100 in which the second mirror 130 pivots with respect to the second end 144 of the support structure 140. In the embodiment illustrated in FIG. 3b, the second mirror 130 is mounted to the second end 144 of the support structure 140 along a second mirror axis 126, and pivots about the second mirror axis 126 as the first mirror 120 pivots about the azimuth axis 122. The arrangement of FIG. 3b controls the pivoting of the second mirror 130 so that the second mirror 130 maintains direction of the light energy (along optical path 111) at a predetermined location (e.g., a portion of the exit window 105 such as the center of the exit window 105, and/or a predetermined target). In the embodiment depicted in FIG. 3b, the system 100 includes a first motor 128 (see also FIGS. 2a, 2b, and 3a) and a geared linkage 350. The first motor 128 is coupled to the first mirror 120 and is to pivot the first mirror 120 about the azimuth axis 122 (e.g., via first shaft 329). The geared linkage 350 is coupled to the first motor 128 (e.g., via first shaft 329 or a separate output shaft) and to the second mirror 130. The geared linkage 350 rotates the second mirror 130 a predetermined desired amount relative to the rotation of the first mirror 120. In the illustrated embodiment, the geared linkage 350 includes a second shaft 330 that extends along a second mirror axis 126, and the geared linkage pivots the second mirror 130 about the second mirror axis 126. The amount of rotation (and accordingly, one or more gear ratios of the geared linkage 350) of the second mirror 130 may be determined based on the geometrical relationships between the first mirror 120, second mirror 130, and desired orientation of optical path 111 (e.g., through the center of the exit window 105). It may be noted that the geared linkage 350 in various embodiments need not necessarily include gears, but may include belts or other variable drive mechanisms alternatively or additionally.

Accordingly, for example using arrangements such as those represented by FIGS. 3a and 3b, the second mirror 130 may pivot with respect to the second end 144 of the support structure. For example, FIG. 1 provides another example of pivoting of the second mirror 130 with respect to the support structure. In the embodiment depicted in FIG. 1, as the first mirror 120 pivots about the azimuth axis 122, the support structure 140 (and second mirror 130 which is mounted to the support structure 140) rotate to keep the optical path 111 from the first mirror centered on the second mirror 130. Also, the second mirror 130 pivots with respect to the second end 144 of the support structure 140 (e.g., pivots about a second mirror axis 126 as discussed in connection with FIGS. 3a and 3b) to keep the optical path 111 centered on the exit window 105.

Figure 4:
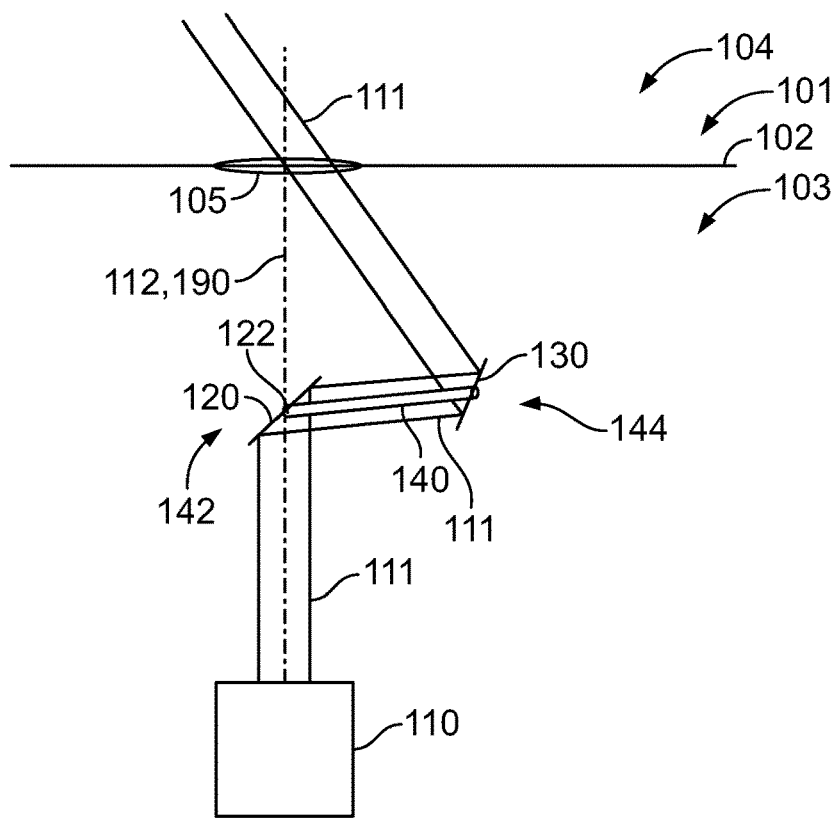
FIG. 4 illustrates an optical system in which a second mirror does not pivot relative to a second end of a support structure, according to an embodiment of the present disclosure.

In other embodiments, the second mirror 130 may be rotationally fixed with respect to the second end 144 of the support structure 140, for example to reduce cost, weight, and/or complexity of the system 100. FIG. 4 illustrates an example embodiment of the system 100 in which the second mirror 130 does not pivot relative to the second end 144 of the support structure 140. As seen in FIG. 4, the first mirror 120 has been pivoted to a position at which the optical path 111 after being re-directed by the second mirror 130 is no longer centered on the exit window 105. It may be noted that at some rotational positions of the first mirror 120, the optical path 111 may be centered on the exit window 105, but at other rotational positions, the optical path 111 may be allowed to walk or vary from the center of the exit window 105. The geometrical relationships between the first mirror 120 and the second mirror 130 (e.g., the distance at which they are separated, the angular position of the second mirror 130 with respect to the first mirror 120) may be selected to maintain the amount of walk or variance of the optical path 111 from the center of the exit window 105 within a tolerable or desired range.

Figure 5:
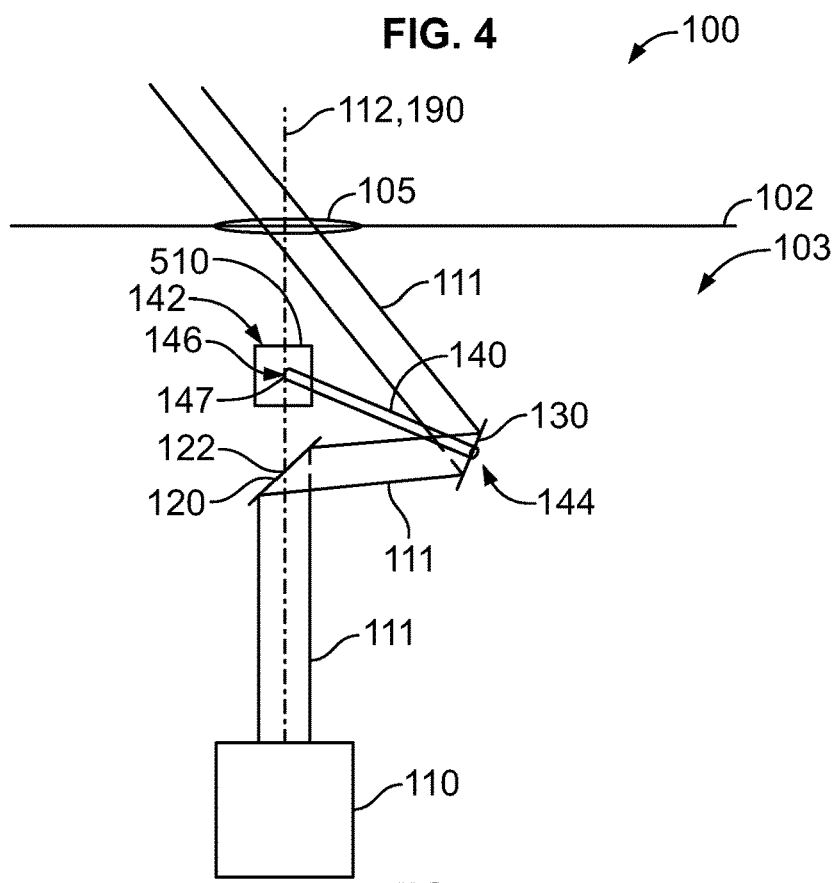
FIG. 5 illustrates an optical system in which a support rotation point is disposed along an optical axis but offset from an azimuth axis, according to an embodiment of the present disclosure.

In the embodiments depicted in FIGS. 1 and 4, the first end 142 of the support structure 140 is mounted to the first mirror 120 such that the support rotation point 146 lies along the azimuth axis 122. Accordingly, the support structure 140 rotates about the same axis that the first mirror 120 pivots about. In other embodiments, however, the axis of rotation for the support structure 140 may not coincide with the axis of pivoting of the first mirror 120. For example, FIG. 5 illustrates an example embodiment of the system 100 in which the support rotation point 146 is disposed along the optical axis 112 but offset from the azimuth axis 122. A support structure axis 147 passes through the support rotation point 146 and is oriented parallel to the azimuth axis 122, with the support structure 140 rotating about the support structure axis 147. For example, the first end 142 of the support structure 140 may be rotationally mounted to a structure 510 located in the interior 103, with the support structure 140 rotates about the support rotation point 146 passing through the structure 510 (e.g., via a shaft passing through the structure 510 extending along the support structure axis 147). Generally, the support structure 140 rotates a predetermined amount relative to a rotation or pivoting of the first mirror 120 about the azimuth axis 122 to maintain the optical path 111 on the second mirror 130 as the first mirror 120 pivots. For example, a motor may be mounted to a shaft that has an axis passing through the support rotation point, with the motor controlled to rotate the support structure 140 at a desired rate relative to rotation of the first mirror 120 to maintain the optical path 111 on the second mirror 130. (See FIG. 3a for an example of a motor pivoting the second mirror 130; a similar arrangement may be used to rotate the support structure.) As another example, a shaft passing through the structure 510 and along an axis parallel to the azimuth axis 122 may be driven by the first motor 128 via a geared linkage. (See FIG. 3b for an example of a geared linkage pivoting the second mirror 130; a similar arrangement may be used to rotate the support structure.) Locating the support rotation point 146 off of the azimuth axis 122 allows an additional degree of freedom in selecting geometry to suit a particular application.

Figure 6:
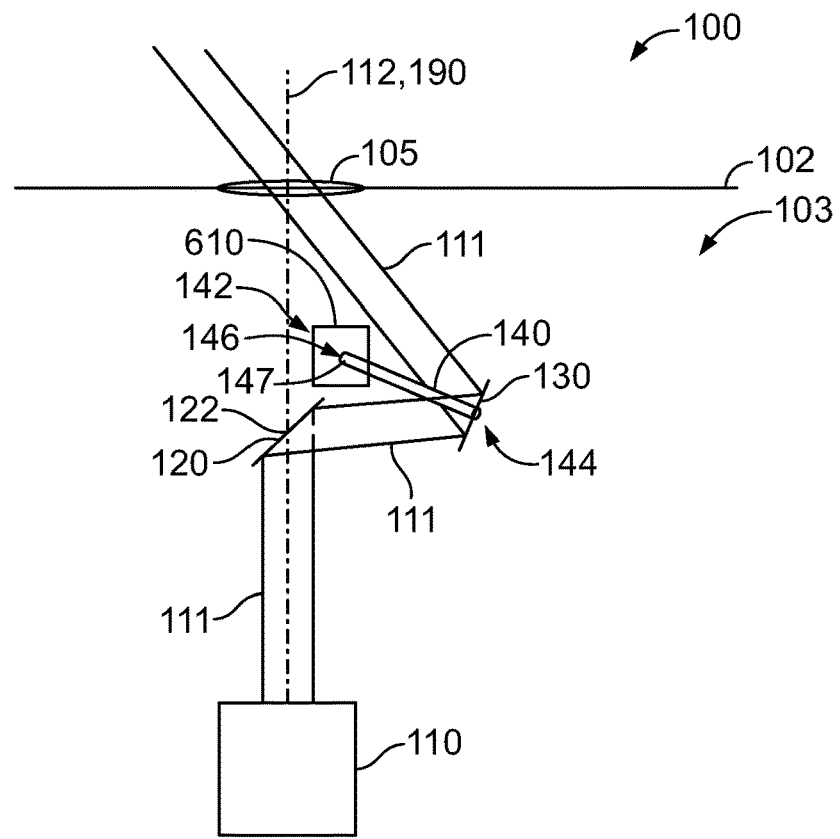
FIG. 6 illustrates an optical system in which a support rotation point is disposed offset from an optical axis and offset from an azimuth axis, according to an embodiment of the present disclosure.

FIG. 6 provides another example in which the axis of rotation for the support structure 140 does not coincide with the axis of pivoting of the first mirror 120. FIG. 6 illustrates an example embodiment of the system 100 in which the support rotation point 146 is disposed offset from both the optical axis 112 the azimuth axis 122. A support structure axis 147 passes through the support rotation point 146 and is oriented parallel to the azimuth axis 122, with the support structure 140 rotating about the support structure axis 147. For example, the first end 142 of the support structure 140 may be rotationally mounted to a structure 610 located in the interior 103, with the support structure 140 rotating about the support rotation point 146 passing through the structure 610 (e.g., via a shaft extending along the support structure axis 147). Generally, as with the example discussed in connection with FIG. 5, the support structure 140 rotates a predetermined amount relative to a rotation or pivoting of the first mirror 120 about the azimuth axis 122 to maintain the optical path 111 on the second mirror 130 as the first mirror 120 pivots. Locating the support rotation point 146 off of the azimuth axis 122 and off of the optical axis 112 provides an additional amount of freedom in selecting geometry to suit a particular application. It may be noted that for either of the arrangements represented by FIG. 6 or 7, the second mirror 130 may pivot with respect to the second end 144 of the support structure 140 in some embodiments, and not pivot with respect to the second end 144 of the support structure 140 in other embodiments.

Figure 7:
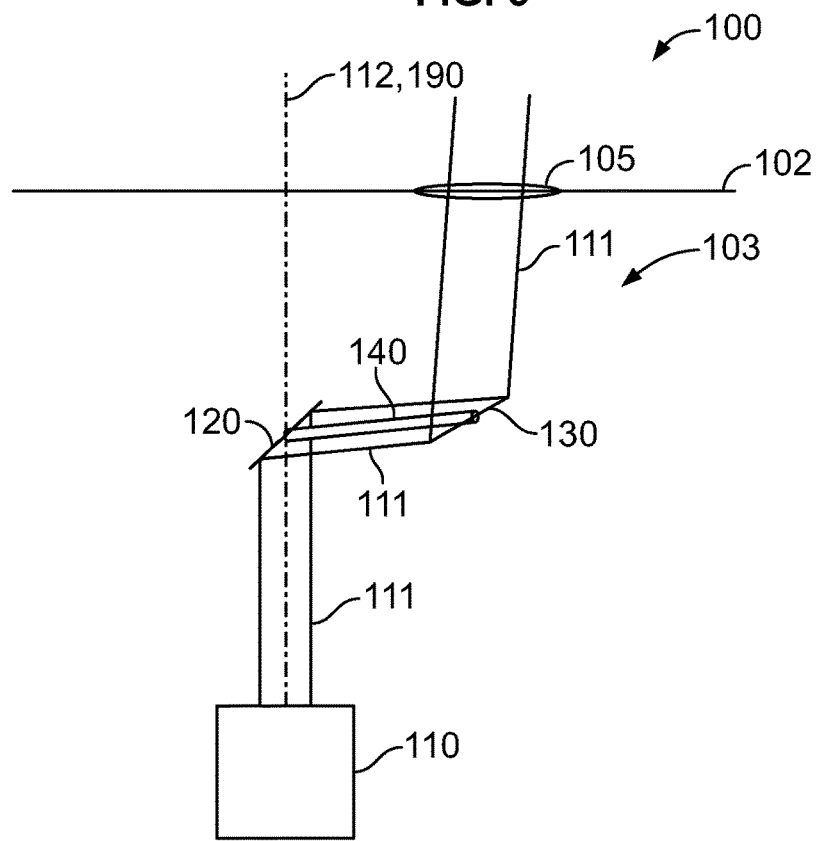
FIG. 7 illustrates an optical system in which an optical axis does not pass through an exit window.

It may be noted that in some embodiments, the optical axis 112 may not pass through the exit window 105. For example, FIG. 7 illustrates an example of the system 100 in which the optical axis 112 does not pass through the exit window 105. Instead, the exit window 105 is offset from the optical axis 112. The angle of the second mirror 130 relative to the first mirror 120 is selected to direct the optical path 111 to the exit window 105. Location of the exit window 105 off of the optical axis allows for additional flexibility in defining the range over which the optical path 111 may be directed. For example, in the example of FIG. 1, it may not be possible to direct the optical path 111 toward a target outside of the interior 103 that is along the optical axis 112, or to direct the optical path 111 directly normal to the boundary 102. However, it may be possible with an arrangement such as that represented by FIG. 7 to direct the optical path 111 toward a target outside of the interior 103 that is parallel to the optical axis 112, and/or to direct the optical path 111 directly normal to the boundary 102.

Figure 8:
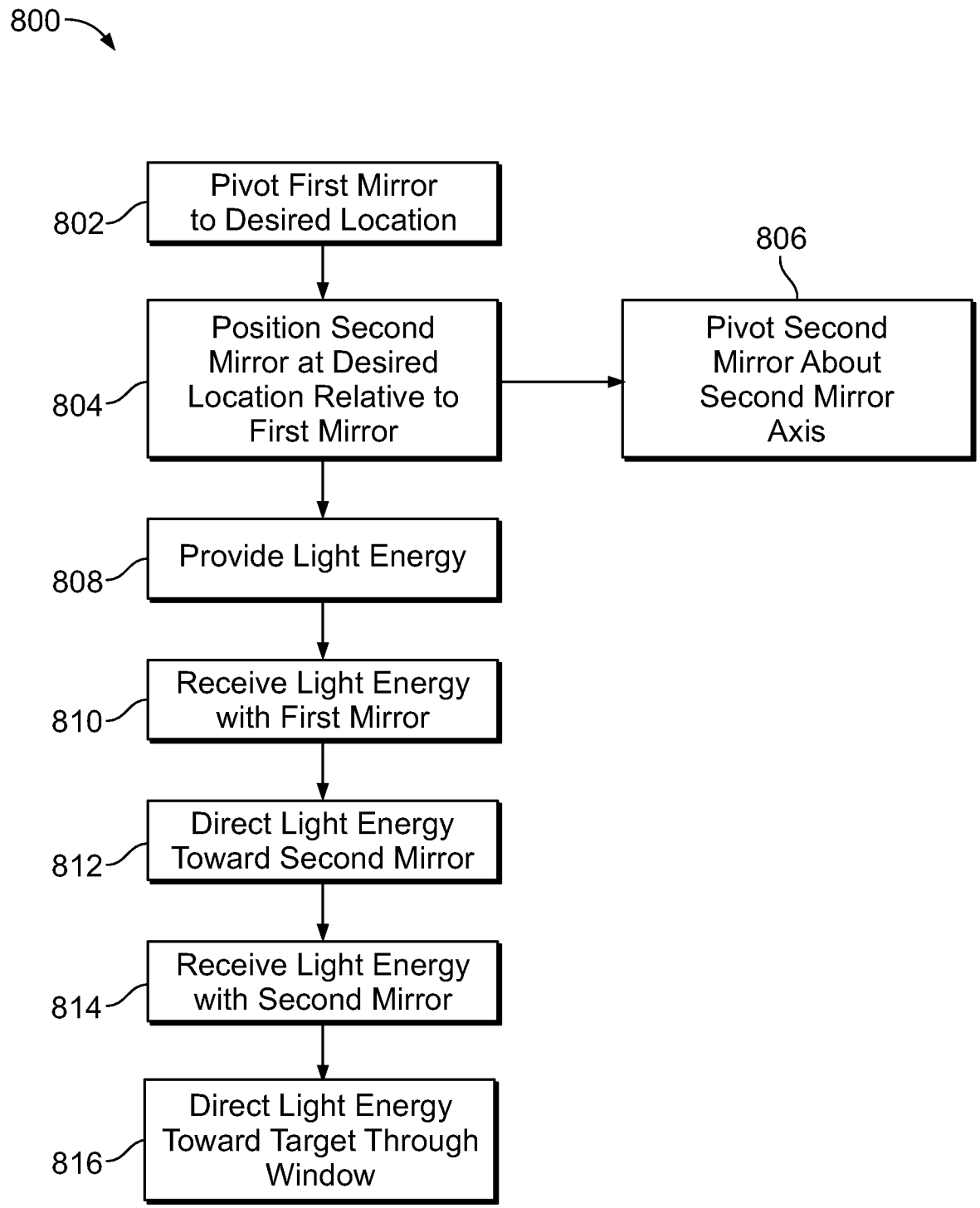
FIG. 8 is a flowchart of a method, according to an embodiment of the present disclosure.

FIG. 8 provides a flowchart of a method 800 for directing or aiming light energy (e.g., a laser), in accordance with various embodiments. The method 800, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, or certain steps may be performed in a different order.

At 802, a first mirror (e.g., first mirror 120) of a system (e.g., system 100) is pivoted to a desired location (e.g., a predetermined location corresponding to delivering light energy through a window to a desired target). The first mirror in various embodiments is pivoted about an azimuth axis. Generally, the first mirror is located to receive light energy from a light source and to re-direct the light energy toward a second mirror (e.g., second mirror 130). In various embodiments, the first mirror and other components of the system are disposed within an interior volume, such as an interior volume of an aircraft.

At 804, the second mirror is positioned at a desired location relative to the first mirror to re-direct light energy received from the first mirror through an exit window toward a target. In various embodiments, the second mirror is mounted to a support structure that rotates when the first mirror pivots to maintain the optical path from the first mirror being directed toward the second mirror. In various embodiments, the support structure has a first end and a second end, with the first end mounted to a support rotation point, and with the second mirror mounted to the second end of the support structure. The support structure is rotates about a support rotation point as the first mirror pivots about the azimuth axis. In some embodiments the support structure rotates bout the azimuth axis. In some embodiments, the support structure rotates about an axis that is parallel to the azimuth axis.

In some embodiments, positioning the second mirror includes not only rotating the support structure, but also pivoting the second mirror with respect to the support structure. For example, in the illustrated embodiment, the second mirror is mounted to the second end of the support structure along a second mirror axis, and, at 806, the second mirror is pivoted about the second mirror axis as the first mirror pivots. For example, in some embodiments, the first mirror is pivoted about the azimuth axis using a first motor, and the second mirror is pivoted about the second mirror axis using a second motor, with the second motor controlled based on the rotation of the first mirror to maintain the second mirror in a position relative to the first mirror to deliver the optical path to a desired location. As another example, in some embodiments, the first mirror is pivoted about the azimuth axis using a first motor, and the second mirror is pivoted about the second mirror axis via a geared linkage coupling the second mirror to the first motor.

At 808, light energy from a light source (e.g., light source 110) is provided along an optical path extending along an optical axis. The first mirror is disposed along the optical path. The light source, for example, may be a laser.

At 810, the light energy is received with the first mirror. As discussed herein, the first mirror pivots about the azimuth axis. At 812, the light energy is directed toward the second mirror with the first mirror. At 814, the light energy is received by the second mirror from the first mirror, and, at 816, the light energy is directed with the second mirror toward a target through a window (e.g., exit window 105). The positioning of the first mirror, and the positioning of the second mirror with respect to the first mirror, determines the direction of the beam. Accordingly, the first mirror and second mirror are controlled to be positioned to provide a desired direction or orientation of the optical path through the exit window so that the target is aligned along the optical path leaving the exit window.

Figure 9:
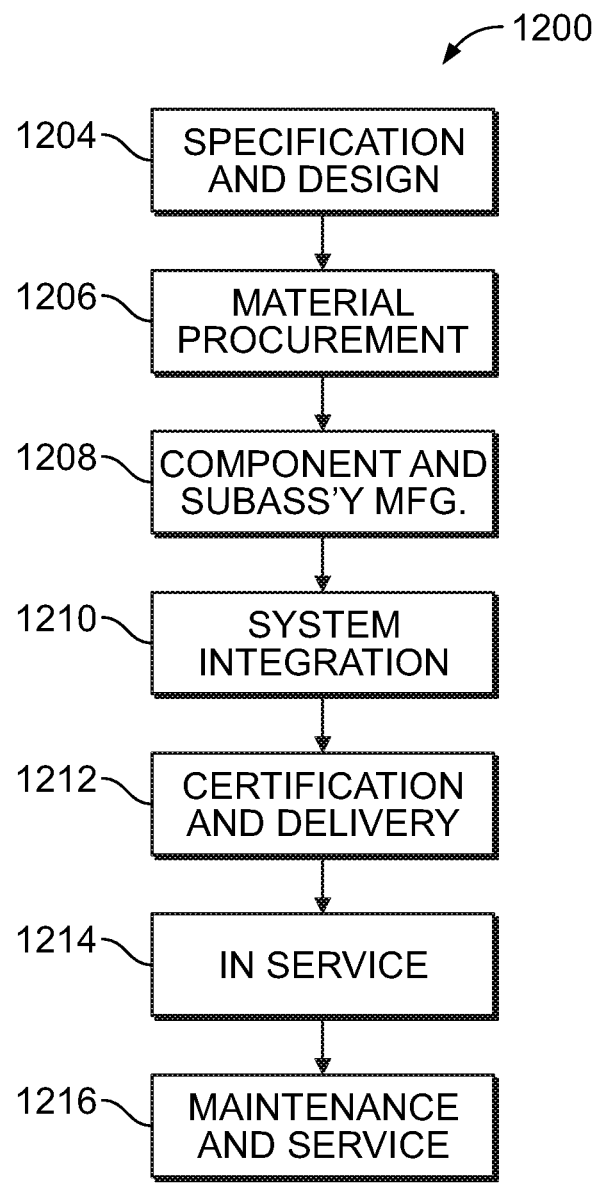
FIG. 9 is a block diagram of aircraft production and service methodology.
Figure 10:
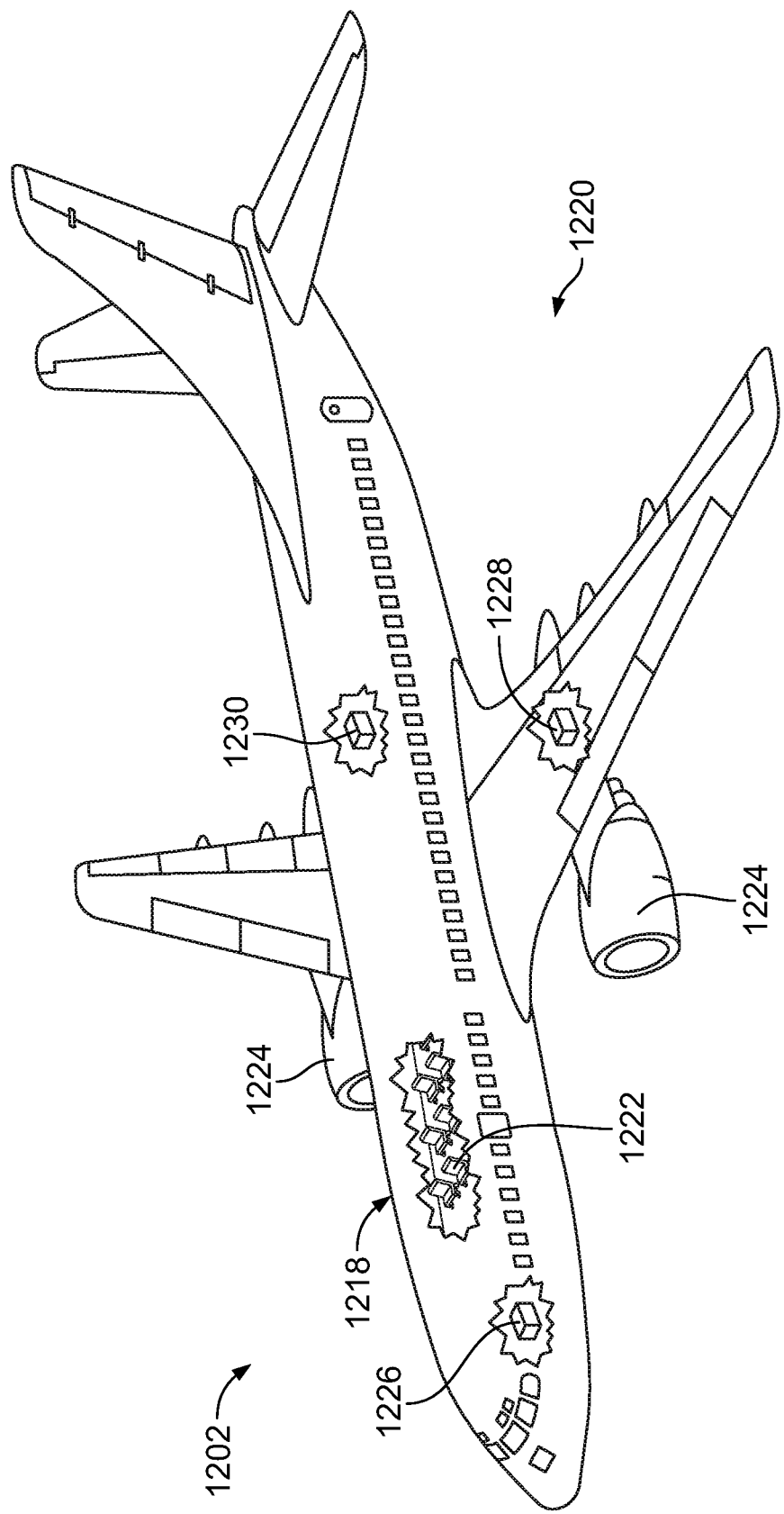
FIG. 10 is a schematic illustration of an aircraft.

Examples of the present disclosure may be described in the context of aircraft manufacturing and service method 1200 as shown in FIG. 9 and aircraft 1202 as shown in FIG. 10. During pre-production, method 1200 may include specification and design (block 1204) of aircraft 1202 and material procurement (block 1206). During production, component and subassembly manufacturing (block 1208) and system integration (block 1210) of aircraft 1202 may take place. Thereafter, aircraft 1202 may go through certification and delivery (block 1212) to be placed in service (block 1214). While in service, aircraft 1202 may be scheduled for routine maintenance and service (block 1216). Routine maintenance and service may include modification, reconfiguration, refurbishment, etc. of one or more systems of aircraft 1202. For example, in various embodiments, examples of the present disclosure may be used in conjunction with one or more of blocks 1208, 1210, or 1216.

Each of the processes of illustrative method 1200 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, aircraft 1202 produced by illustrative method 1200 may include airframe 1218 with a plurality of high-level systems 1220 and interior 1222. Examples of high-level systems 1220 include one or more of propulsion system 1224, electrical system 1226, hydraulic system 1228, and environmental system 1230. Any number of other systems may be included. Although an aerospace example is shown, the principles disclosed herein may be applied to other industries, such as the automotive industry. Accordingly, in addition to aircraft 1202, the principles disclosed herein may apply to other vehicles, e.g., land vehicles, marine vehicles, space vehicles, etc. In various embodiments, examples of the present disclosure may be used in conjunction with one or more of airframe 1218 or interior 1222.

Apparatus(es) and method(s) shown or described herein may be employed during any one or more of the stages of the manufacturing and service method 1200. For example, components or subassemblies corresponding to component and subassembly manufacturing 1208 may be fabricated or manufactured in a manner similar to components or subassemblies produced while aircraft 1202 is in service. Also, one or more examples of the apparatus(es), method(s), or combination thereof may be utilized during production stages 1208 and 1210, for example, by substantially expediting assembly of or reducing the cost of aircraft 1202. Similarly, one or more examples of the apparatus or method realizations, or a combination thereof, may be utilized, for example and without limitation, while aircraft 1202 is in service, e.g., maintenance and service stage (block 1216).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the spirit and scope of the present disclosure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a light source that provides light energy along an optical path extending along an optical axis;
a first mirror disposed along the optical path, the first mirror receiving and re-directing the light energy from the light source, the first mirror pivoting about an azimuth axis;
a second mirror that receives the re-directed light energy from the first mirror and re-directs the light energy toward a target through a window; and
a support structure having a first end and a second end, the first end mounted at a support rotation point, the support structure rotating about the support rotation point as the first mirror pivots about the azimuth axis, the support structure rotating about the azimuth axis or an axis parallel to the azimuth axis, the second mirror mounted to the second end of the support structure.

2. The system of claim 1, wherein the support rotation point is disposed along the azimuth axis, and the first end of the support structure is mounted to the first mirror along the azimuth axis.

3. The system of claim 1, wherein the second mirror is mounted to the second end of the support structure along a second mirror axis, the second mirror pivoting about the second mirror axis as the first mirror pivots, wherein the second mirror maintains direction of the light energy at a predetermined location.

4. The system of claim 3, further comprising a first motor coupled to the first mirror and pivoting the first mirror about the azimuth axis, and a second motor coupled to the second mirror and pivoting the second mirror about the second minor axis.

5. The system of claim 3, further comprising a first motor and a geared linkage, the first motor coupled to the first mirror, the first motor pivoting the first minor about the azimuth axis, the geared linkage coupled to the first motor and the second mirror, the first motor pivoting the second minor via the geared linkage.

6. The system of claim 1, wherein the second minor does not pivot relative to the support structure.

7. The system of claim 1, wherein the support rotation point is disposed along the optical axis and offset from the azimuth axis.

8. The system of claim 1, wherein the support rotation point is disposed off of the optical axis.

9. The system of claim 1, wherein the optical axis does not pass through the window.

10. A system comprising:
an enclosure having a boundary defining an interior and an exterior, the enclosure comprising a exit window disposed along the boundary;
a light source disposed within the interior of the enclosure, the light source providing light energy along an optical path extending along an optical axis;
a first minor disposed within the interior of the enclosure along the optical path, the first mirror receiving and re-directing the light energy from the light source, the first mirror pivoting about an azimuth axis;
a second mirror disposed within the interior of the enclosure, the second minor receiving the re-directed light energy from the first minor and re-directing the light energy toward a target through the exit window; and
a support structure disposed within the interior of the enclosure, the support structure having a first end and a second end, the first end mounted at a support rotation point, the support structure rotating about the support rotation point as the first minor pivots about the azimuth axis, the support structure rotating about the azimuth axis or an axis parallel to the azimuth axis, the second minor mounted to the second end of the support structure.

11. The system of claim 10, wherein the support rotation point is disposed along the azimuth axis, and the first end of the support structure is mounted to first mirror along the azimuth axis.

12. The system of claim 10, wherein the second mirror is mounted to the second end of the support structure along a second mirror axis, the second mirror pivoting about the second minor axis as the first mirror pivots, wherein the second mirror maintains direction of the light energy at a predetermined location.

13. The system of claim 10, wherein the second minor does not pivot relative to the support structure.

14. The system of claim 10, wherein the support rotation point is disposed along the optical axis and offset from the azimuth axis.

15. The system of claim 10, wherein the support rotation point is disposed off of the optical axis.

16. The system of claim 10, wherein the light source defines an optical path, and wherein the target is not aligned with the optical path.

17. A method including providing light energy from a light source along an optical path extending along an optical axis;
receiving the light energy with a first mirror disposed along the optical path, the first mirror pivoting about an azimuth axis;
directing the light energy with the first mirror toward a second mirror;
receiving the directed light energy from the first mirror with the second mirror; and
directing the light energy with the second mirror toward a target through a window; and
wherein a support structure has a first end and a second end, the first end mounted at a support rotation point, the support structure rotating about the support rotation point as the first mirror pivots about the azimuth axis, the support structure rotating about the azimuth axis or an axis parallel to the azimuth axis, the second mirror mounted to the second end of the support structure.

18. The method of claim 17, wherein the second mirror is mounted to the second end of the support structure along a second mirror axis, the method comprising pivoting the second mirror about the second mirror axis as the first mirror pivots, wherein the second mirror maintains direction of the light energy at a predetermined location.

19. The method of claim 18, further comprising pivoting the first mirror about the azimuth axis using a first motor, and pivoting the second mirror about the second mirror axis using a second motor.

20. The method of claim 18, further comprising pivoting the first mirror about the azimuth axis using a first motor, and pivoting the second mirror about the second mirror axis via a geared linkage coupling the second mirror to the first motor.

* * * * *

UNITED STATES PATENT AND TRADEMARK OFFICE
CERTIFICATE OF CORRECTION

PATENT NO. : 10,663,717 B2
APPLICATION NO. : 15/692427
DATED : May 26, 2020
INVENTOR(S) : Dale Alan Parkes Page 1 of 1

It is certified that error appears in the above-identified patent and that said Letters Patent is hereby corrected as shown below:

In the Claims

Column 13, Line 66: Delete "a first minor" and insert --a first mirror--

Signed and Sealed this
Fourteenth Day of July, 2020

Andrei Iancu
*Director of the United States Patent and Trademark Office*